United States Patent
Elliott et al.

(10) Patent No.: US 12,228,422 B2
(45) Date of Patent: Feb. 18, 2025

(54) NAVIGATION SYSTEM FOR UNMANNED AIRCRAFT IN UNKNOWN ENVIRONMENTS

(71) Applicant: Southwest Research Institute, San Antonio, TX (US)

(72) Inventors: Logan A. Elliott, San Antonio, TX (US); Anthony J. Wagner, San Antonio, TX (US); Justin B. Daniel, San Antonio, TX (US); Stephen A. Geiger, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 190 days.

(21) Appl. No.: 17/902,977

(22) Filed: Sep. 5, 2022

(65) Prior Publication Data
US 2024/0078914 A1    Mar. 7, 2024

(51) Int. Cl.
*G01C 21/00* (2006.01)
*G01C 21/34* (2006.01)
*G05D 1/644* (2024.01)
*G05D 109/20* (2024.01)
*G08G 5/00* (2006.01)

(52) U.S. Cl.
CPC ..... *G01C 21/3833* (2020.08); *G01C 21/3461* (2013.01); *G05D 1/6445* (2024.01); *G05D 2109/20* (2024.01)

(58) Field of Classification Search
None
See application file for complete search history.

(56) References Cited

U.S. PATENT DOCUMENTS

| | | | |
|---|---|---|---|
| 2018/0260626 A1* | 9/2018 | Pestun | G08G 5/0069 |
| 2019/0226854 A1* | 7/2019 | Geissler | G06V 20/584 |
| 2020/0158526 A1* | 5/2020 | McKenna | G01C 21/3415 |

(Continued)

FOREIGN PATENT DOCUMENTS

| | | | | |
|---|---|---|---|---|
| CN | 111638526 A | * | 9/2020 | G01C 21/00 |
| WO | WO-2023077341 A1 | * | 5/2023 | G05D 1/10 |

OTHER PUBLICATIONS

English translation of CN111638526A, retrieved from Espacenet on Jun. 7, 2024 (Year: 2024).*

(Continued)

*Primary Examiner* — Amelia Vorce
(74) *Attorney, Agent, or Firm* — Livingston Law Firm

(57) ABSTRACT

An on-board navigation system for an unmanned aircraft system (UAS) operating in an unknown environment. A point-cloud sensor system generates point cloud data representing the unknown environment. An on-board processing system processes the point cloud data to generate both a 2-D occupancy grid and a 3-D voxel map, with the 2-D occupancy grid having cells with known (seen) and unknown data. Additional processing determines an amount of known-to-unknown (transitional) data in each cell, thereby determining unexplored regions. A cost is assigned to each unexplored region, based at least in part on the amount of transitional data in cells of the region. The unexplored regions are then sorted based on their costs, thereby determining an optimal region to explore. The 3-D voxel map is used to find a safe area within the optimal region where the UAS may fly. A flight path to the optimal region is then calculated.

12 Claims, 2 Drawing Sheets

FIG. 2

(56) References Cited

U.S. PATENT DOCUMENTS

| | | | |
|---|---|---|---|
| 2021/0256722 A1* | 8/2021 | Staab | G01S 17/89 |
| 2021/0278834 A1* | 9/2021 | Kendoul | G05D 1/0044 |
| 2022/0090938 A1* | 3/2022 | Tsurumi | G06V 20/56 |
| 2022/0121852 A1* | 4/2022 | Curtis | G06N 3/045 |
| 2023/0026679 A1* | 1/2023 | Matarazzo | A01D 46/30 |

OTHER PUBLICATIONS

English translation of WO2023077341A1, retrieved from Espacnet on Jun. 7, 2024 (Year: 2024).*

* cited by examiner

NAVIGATION SYSTEM FOR UNMANNED AIRCRAFT IN UNKNOWN ENVIRONMENTS

TECHNICAL FIELD OF THE INVENTION

This patent application relates to unmanned aircraft, and more particularly to navigation systems for such aircraft.

BACKGROUND OF THE INVENTION

Most unmanned aircraft system (UAS) navigation strategies rely on an a priori map of the environment and/or a specified route through the environment to navigate to a specific goal. With this navigation strategy, an aircraft is unable to operate in unknown or unstructured environments. Many such UAS navigation strategies are based on GPS (global positioning system) or other satellite navigation systems.

When an a priori map or route is not available or not desired to be used, an alternative navigation strategy is the use of onboard sensors to localize, sense, and model the environment, and to thereby navigate safely. "Simultaneous localization and mapping" is an industry term for algorithms that localize and map unknown environments. The UAS carries on-board processing hardware to construct or update a map of an unknown environment while simultaneously keeping track of the UAS's location within it. An effective navigation system prevents a UAS from wandering in a haphazard manner and hitting objects in its path.

Navigation that relies on onboard processing presents difficulties due to the limited payload capacity of a UAS. Payload capacity limits the number of sensors and processing units that a UAS can carry while still being able to fly for a reasonable amount of time.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a navigation method that enables a UAS to explore unknown environments using onboard sensors and processing without external guidance from an operator and without reliance on GPS (global positioning system) or other GNSS (global navigation satellite system).

The UAS carries an on-board mapping and exploration system that performs simultaneous localization and mapping. As it flies, the UAS builds a map of its surroundings while tracking its own movement through that environment. An onboard lidar system (or other cloud point sensor system) senses physical surroundings and their distances. Meanwhile, inertial sensors record the craft's movements. The mapping and exploration system continuously processes the data to generate a map that it uses to navigate through the environment. The system is implemented with minimal hardware, thereby minimizing the weight and cost of the UAS payload.

Examples of applications of the mapping and exploration system are disaster site surveillance, building and infrastructure inspection, and military reconnaissance. The applications include applications in which satellite navigation systems such as GPS are unavailable or not desired to be used.

Figure 1A:
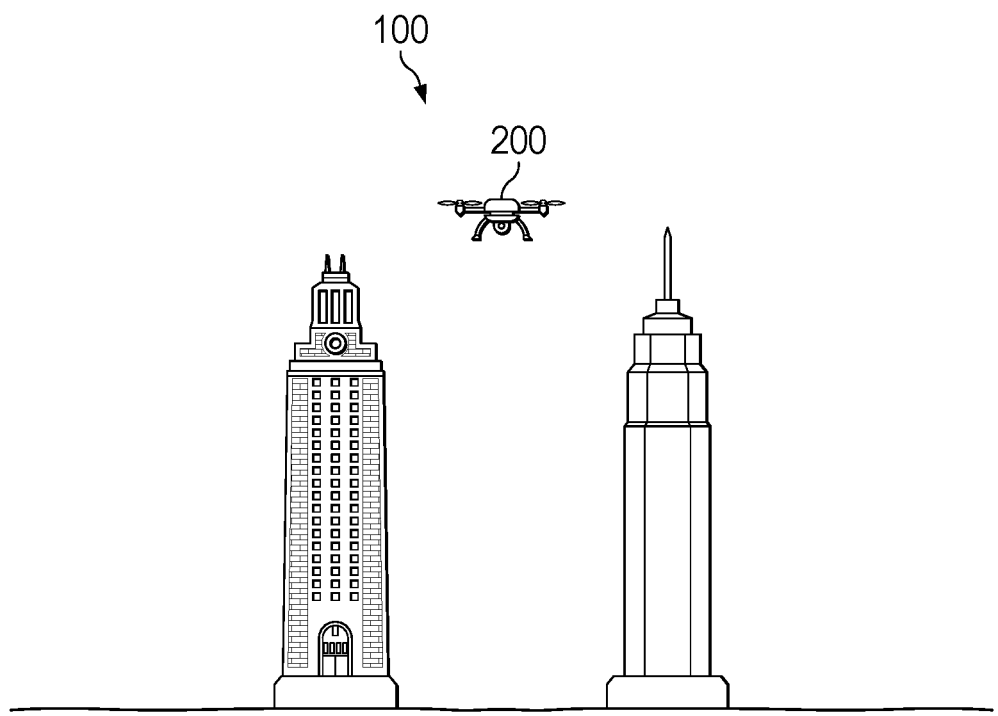
FIG. 1A illustrates a UAS equipped with a navigation system in accordance with the invention.

FIG. 1A illustrates a UAS 100 in flight in an unknown environment. In other words, the UAS 100 has no pre-existing map of its environment. Nor does the UAS 100 have directions for a pre-determined route. As explained below, the UAS 100 is equipped with a navigation system 200 that allows it generate a map that captures landmark information. In the example of FIG. 1A, the landmarks are buildings, but any object can be part of the map. The landmarks may be parts of the terrain, such as mountains and valleys.

The term "UAS" is used herein to include the various systems that make a UAV (unmanned aerial vehicle) work including its navigation hardware and software. The UAS of this description may be fully autonomous. It is assumed that the UAS is equipped with mechanical and control systems capable of receiving and carrying out directions for a flight path as determined by the navigation system. The UAS is also assumed to be equipped with an IMU (inertial measurement unit).

Figure 1B:
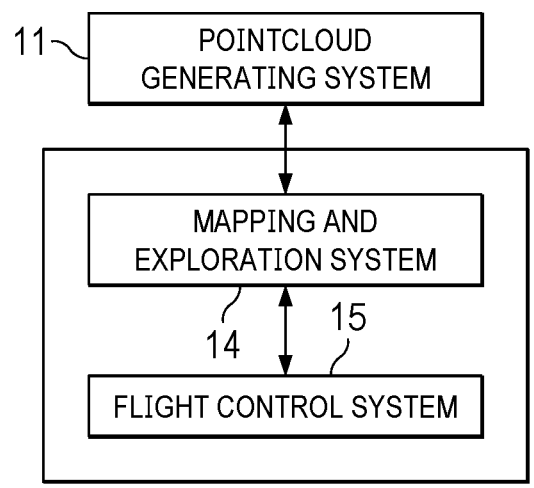
FIG. 1B illustrates the elements of the navigation system in accordance with the invention.

FIG. 1B illustrates a UAS navigation system 200 in accordance with the invention. As explained below, all computations are performed on-board and in real time. The entire navigation system 200 is carried on-board the UAS and requires no external communication.

The UAS 100 is equipped with a point cloud generating system 11, having at least one point cloud generating sensor. The "point cloud" is a digital three-dimensional representation of the physical space in the sensor system's field of view as the UAS travels. The points represent x, y, and z geometric coordinates of the environment, that is, a three-dimensional representation of the landmarks in a given coordinate system.

Various types of sensors may be used to acquire point cloud data. These sensors fall into two general categories: laser scanners and photogrammetry. An example of a laser scanner is a lidar sensor, which measures how long laser pulses sent in all directions take to bounce back to the sensor. An example of photogrammetry sensors is stereoscopic vision sensors. Another suitable type of sensor is time-of-flight sensors or depth cameras. These use time-of-flight sensing to measure the reflected light that comes from its own light-source emitter.

As explained further below in connection with FIG. 2, a mapping and exploration system 14 generates a flight path for the UAS, based on its current mapping knowledge.

A UAS flight control system 15 receives the flight path generated by the mapping and exploration system 14. It generates the appropriate control commands to the UAS's mechanical systems so that the UAS follows that path in its flight.

Figure 2:
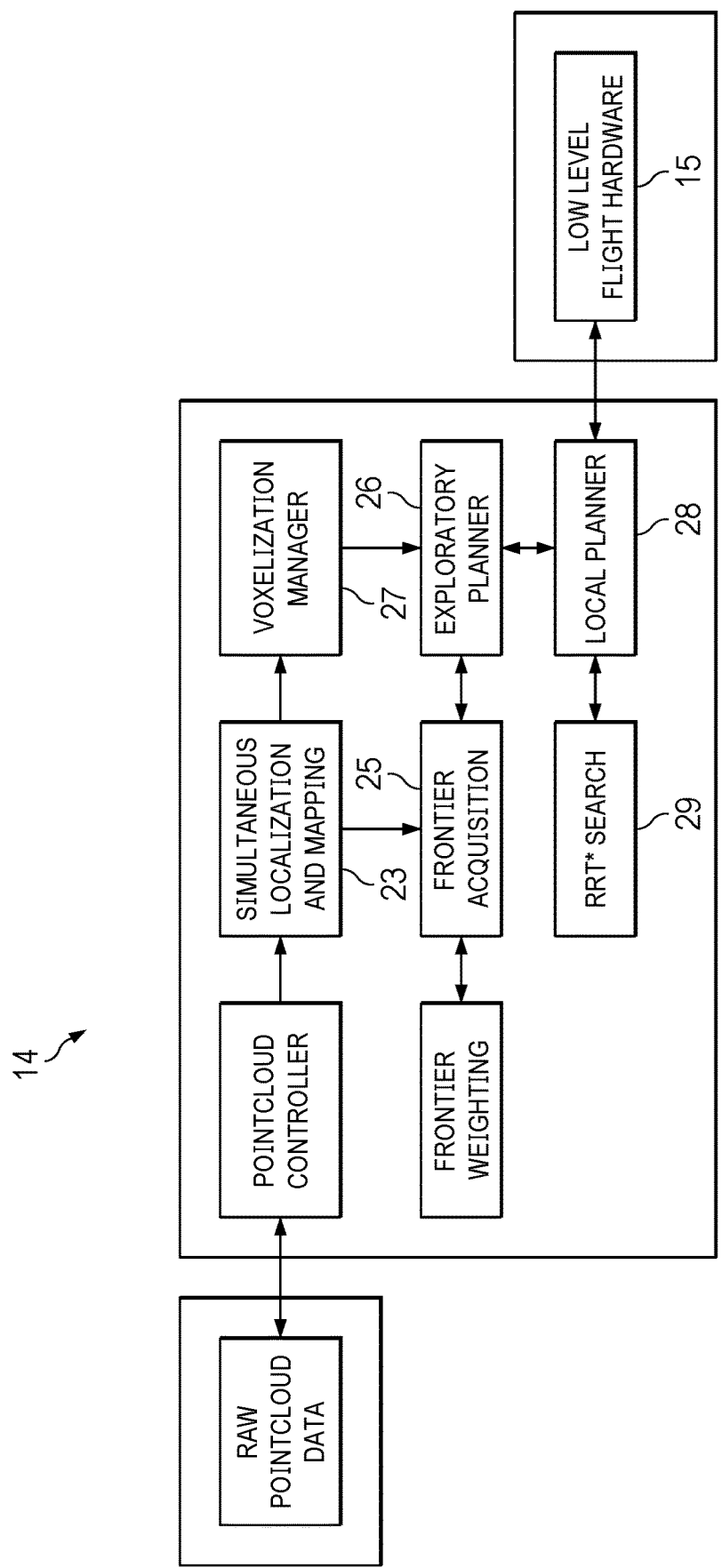
FIG. 2 illustrates the mapping and exploration system of FIG. 1B in further detail.

FIG. 2 illustrates the various processes that comprise the mapping and exploration system 14.

A SLAM (simultaneous localization and mapping) process 23 uses the point cloud data and data from the IMU to build both a two-dimensional (2D) occupancy grid and a three-dimensional (3D) voxel map of the environment.

The 2D occupancy grid represents the environment as a discrete grid. The grid comprises arrays (typically square or hexagonal) of discretized cells that represent the environment.

The 3D voxel map represents the environment as voxels. A voxelization process 27 stores and manages the voxel map.

The 2D occupancy grid is processed by a frontier acquisition process 25, which treats the grid as an image and uses a Sobel filter to determine the amount of transitional data (i.e., known-to-unknown data) in each cell.

The transitional data of the occupancy grid is used to determine the unexplored regions of the environment. The environment begins as "unknown", with cells having no map data. As the UAS generates a map of the environment, data within cells become "known" (seen). An unexplored region (also referred to herein as a "frontier) is a group of one or more cells having unknown data.

Frontier acquisition 25 further assigns each unexplored region a cost based on the amount of transitional data within the cell(s) that make up the region, the number of surrounding unexplored regions, the Euclidean distance from the UAS to the region, and how easily the UAS can maneuver to the unexplored region.

Unexplored regions and their associated costs are passed to an exploratory planning process 26. The exploratory planning process 26 sorts the unexplored regions based on their cost to determine an optimal region to explore.

The position of the optimal region is not guaranteed to be in an open space. Therefore, the exploratory planning process 26 uses the 3D voxel map to shift the optimal region's centroid into a safe area for the UAS to navigate.

While the exploratory planning process 26 evaluates an optimal unexplored region to fly to, it also evaluates when to return to the starting location based on the remaining available flight time.

The safe location of the optimal region is sent to a local planning process 28. The local planning process 28 uses the output of a modified rapidly exploring random tree star (RRT*) search process 29. Using sweeping bounding boxes to guide the tree expansion, it explores, plans, and optimizes flight paths for the UAS. It uses the 3D voxel map, which provides information about the occupied and unoccupied space around the UAS, to calculate an optimized, collision-free path to the location set by the exploratory planning process 26.

The local planning process 28 then delivers the desired path to the flight hardware 15 of the UAS flight control system. The UAS can then safely navigate through the unknown environment while only using onboard sensors and processing devices to produce an accurate map of the environment.

If the local planning process 28 is not able to plan a path to the desired frontier with an allotted time period, it sends a signal to the exploratory planner process 26. This signal indicates an unsuccessful planning cycle, and the exploratory planning process 26 labels that frontier as inaccessible.

What is claimed is:

1. A method of on-board navigation through an unknown environment for an unmanned aircraft system (UAS), comprising:
    using a sensor system to generate point cloud data representing an environment of the UAS as the UAS flies;
    using a processing system to perform the following steps:
        processing the point cloud data to generate both a two-dimensional occupancy grid and a three-dimensional voxel map;
        wherein the two-dimensional occupancy grid comprises cells having known and unknown data;
        determining an amount of known-to-unknown data in each cell of the two-dimensional occupancy grid, thereby determining unexplored regions of the environment;
        assigning a cost to each unexplored region, based at least in part on the amount of known-to-unknown data within cells of the region;
        sorting the unexplored regions based on their costs, thereby determining an optimal region to explore;
        using the three-dimensional voxel map to determine a safe area within the optimal region where the UAS may fly;
        calculating a flight path in the safe area provided by the three-dimensional voxel map;
        generating control signals to navigate the UAS based on the flight path; and
        using the sensor system and the processing system to continuously repeat the method to generate control signals to navigate the UAS based on the flight path.

2. The method of claim 1, wherein the sensor system is a laser scanning system.

3. The method of claim 1, wherein the sensor system is a photogrammetry system.

4. The method of claim 1, wherein the sensor system is a time-of-flight system.

5. The method of claim 1, wherein the step of determining an amount of known-to-unknown data in each cell of the two-dimensional occupancy grid is performed with a Sobel filter.

6. The method of claim 1, wherein the step of assigning a cost to each unexplored region, is further based on a number of surrounding unexplored regions and/or the distance to each unexplored region.

7. A navigation system for an unmanned aircraft system (UAS) operating in an unknown environment, comprising:
    an on-board sensor system operable to generate point cloud data representing an environment of the UAS as the UAS flies;
    an on-board processing system having a process for processing the point cloud data to generate both a two-dimensional occupancy grid and a three-dimensional voxel map; wherein the two-dimensional occupancy grid comprises cells having known and unknown data;
    the on-board navigation system further having processes for determining an amount of known-to-unknown data in each cell of the two-dimensional occupancy grid, thereby determining unexplored regions of the environment; for assigning a cost to each unexplored region, based at least in part on the amount of known-to-unknown data within cells of the region; for sorting the unexplored regions based on their costs, thereby determining an optimal region to explore; for using the three-dimensional voxel map to determine a safe area within the optimal region where the UAS may fly; and for calculating a flight path in the safe area provided by the three-dimensional voxel map; and for generating control signals to navigate the UAS based on the flight path.

8. The system of claim 7, wherein the sensor system is a laser scanning system.

9. The system of claim 7, wherein the sensor system is a photogrammetry system.

10. The system of claim 7, wherein the sensor system is a time-of-flight system.

11. The system of claim 7, wherein the process for determining an amount of known-to-unknown data in each cell of the two-dimensional occupancy grid is performed with a Sobel filter.

12. The system of claim 7, wherein the process for assigning a cost to each unexplored region, further bases the cost on a number of surrounding unexplored regions and/or the distance to each unexplored region.

* * * * *